(12) United States Patent
Omiya et al.

(10) Patent No.: US 7,945,440 B2
(45) Date of Patent: May 17, 2011

(54) AUDIO STREAM NOTIFICATION AND PROCESSING

(75) Inventors: Elliot H. Omiya, Kirkland, WA (US); Noel R. Cross, Seattle, WA (US); Adeel A. Aslam, Redmond, WA (US); Lawrence W. Osterman, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 499 days.

(21) Appl. No.: 12/147,423

(22) Filed: Jun. 26, 2008

(65) Prior Publication Data

US 2009/0326928 A1 Dec. 31, 2009

(51) Int. Cl.
*G10L 19/00* (2006.01)
(52) U.S. Cl. ............... 704/200.1; 704/270.1; 704/272
(58) Field of Classification Search .............. 704/200, 704/208, 210, 214, 215, 226, 200.1, 278, 704/272, 249, 254, 270.1; 381/107
See application file for complete search history.

(56) References Cited

U.S. PATENT DOCUMENTS

| | | | |
|---|---|---|---|
| 6,006,115 A | 12/1999 | Wingate | |
| 6,662,022 B1 | 12/2003 | Kanamori et al. | |
| 7,142,678 B2 * | 11/2006 | Falcon | 381/107 |
| 2004/0101145 A1 | 5/2004 | Falcon | |
| 2005/0221868 A1 | 10/2005 | Childress et al. | |

FOREIGN PATENT DOCUMENTS

| | | |
|---|---|---|
| KR | 20010004498 | 1/2001 |
| KR | 20050090315 | 9/2005 |

OTHER PUBLICATIONS

"PCT Search Report and Written Opinion", Application No. PCT/US2009/048948, (Jan. 14, 2010),11 pages.

* cited by examiner

*Primary Examiner* — Huyen X. Vo (57) ABSTRACT

Various embodiments provide techniques for allowing an application to opt out of system default audio stream behavior, as well as techniques for notifying applications on a computing device that a communication audio stream has been initiated. The techniques may differentiate between communication-related audio streams and audio streams that are not communication-related. In some embodiments, an application may register to receive notification that a communication stream has been initiated. The application may be configured to comply with system default audio stream handling policies, or it can perform custom behavior in response to the audio stream notification. In some embodiments, an application may register for filtered or unfiltered notification. In a filtered notification scenario, an application is notified that a communication stream has been initiated when an audio stream associated with the application has not already been modified in response to the initiation of a different communication stream. In an unfiltered notification scenario, an application/process is notified whenever a communication stream is been initiated.

20 Claims, 5 Drawing Sheets

AUDIO STREAM NOTIFICATION AND PROCESSING

BACKGROUND

A modern computing device is typically capable of performing a variety of different tasks, often simultaneously or pseudo-simultaneously. This capability frequently results in competition for computing device resources. With reference to the competition for audio input/output resources of a computing device, some existing audio resource management solutions utilize an audio stream attenuation behavior referred to as "ducking". Ducking refers to the attenuation of an audio stream's volume in response to a specific event or criteria. In one example, an automobile is configured to detect an incoming telephone call to an occupant of the automobile. When the automobile detects an incoming telephone call, if any audio devices are rendering audio signals inside of the automobile, the automobile will automatically duck the audio signal (e.g., reduce the audio signal volume by a specified amount, such as 50%) so that the telephone can be heard and an occupant of the vehicle can converse over the telephone without undue interference from the audio signal.

While existing audio resource management solutions suffice for such simple scenarios, they suffer from a number of drawbacks that make them unsuitable for more complex or nuanced applications. First, a particular solution often only works with a specific application or group of applications. Second, the solutions are often inflexible and provide few options with respect to the management of audio resources.

SUMMARY

Various embodiments allow an application to opt out of system audio stream behavior. For example, a particular system may include a default system behavior that attenuates non-communication audio streams in response to a communication audio stream being initiated. If an application has opted out of the system audio stream behavior, a non-communication audio stream associated with the application will not be attenuated in response to the communication audio stream being initiated.

Some embodiments notify an application and/or process on a computing device that a communication audio stream has been initiated. In such embodiments, an application/process may register to receive notification that a communication audio stream has been initiated. In response to the notification, an application may initiate one or more custom audio stream behaviors on an audio stream owned by the application.

In some embodiments, an application/process may register for filtered or unfiltered notification. In a filtered notification scenario, an application/process is notified that a communication audio stream has been initiated when an audio stream associated with the application/process has not already been modified in response to the initiation of a different communication audio stream. In an unfiltered notification scenario, an application/process is notified whenever a communication audio stream has been initiated, even if the stream is not owned by the application/process.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The same numbers are used throughout the drawings to reference like features.

DETAILED DESCRIPTION

Overview

Various embodiments notify applications and/or processes on a computing device that a communication audio stream has been initiated. For discussion purposes, the term application is used herein to refer to any number of different processes, software, programs, executable files, and so on, and is not intended to limit the scope of the claimed subject matter. An audio stream may consist of audio data in digital form, and in some examples, the digital audio data is encoded via pulse code modulation (PCM). The audio stream notification may be configured to differentiate between a communication-related audio stream (communication stream) and an audio stream that is not communication-related (non-communication stream). Generally stated, a communication stream includes a capture stream that transports captured audio data, and a render stream that transports audio data to be rendered. Also, a communications stream typically includes audio data that is voice related (e.g., voice chat, phone calls, voice mail, and so on). A non-communication stream generally does not include both a capture stream and a render stream. An audio stream may include metadata that describes aspects and attributes of the audio stream, such as if the audio stream is a communication stream or a non-communication stream.

In some embodiments, an application may register to receive notification that a communication stream has been initiated. The application may be configured to comply with system default audio stream handling policies, or it can opt out of the system default audio stream handling policies (and optionally implement its own custom behavior). One example system default audio stream handling policy specifies that when a communication audio stream is initiated, all non-communication audio streams are to be ducked by a specific percentage while the communication audio stream is active. In some embodiments, an application may register for filtered or unfiltered notification. In one example of a filtered notification scenario, an application is only notified that a communication stream has been initiated when an audio stream associated with the application has not already been modified (e.g., via a default audio stream handling policy) in response to the initiation of a different communication stream. In an example of an unfiltered notification scenario, an application/process is notified whenever a communication stream is initiated, even if the stream is not owed by the application/process.

In the discussion that follows, a section entitled "Operating Environment" is provided and describes an environment in which one or more embodiments can be employed. Following this, a section entitled "Example Processes" is provided and describes processes that can implement various principles and techniques discussed herein.

Operating Environment

Figure 1:
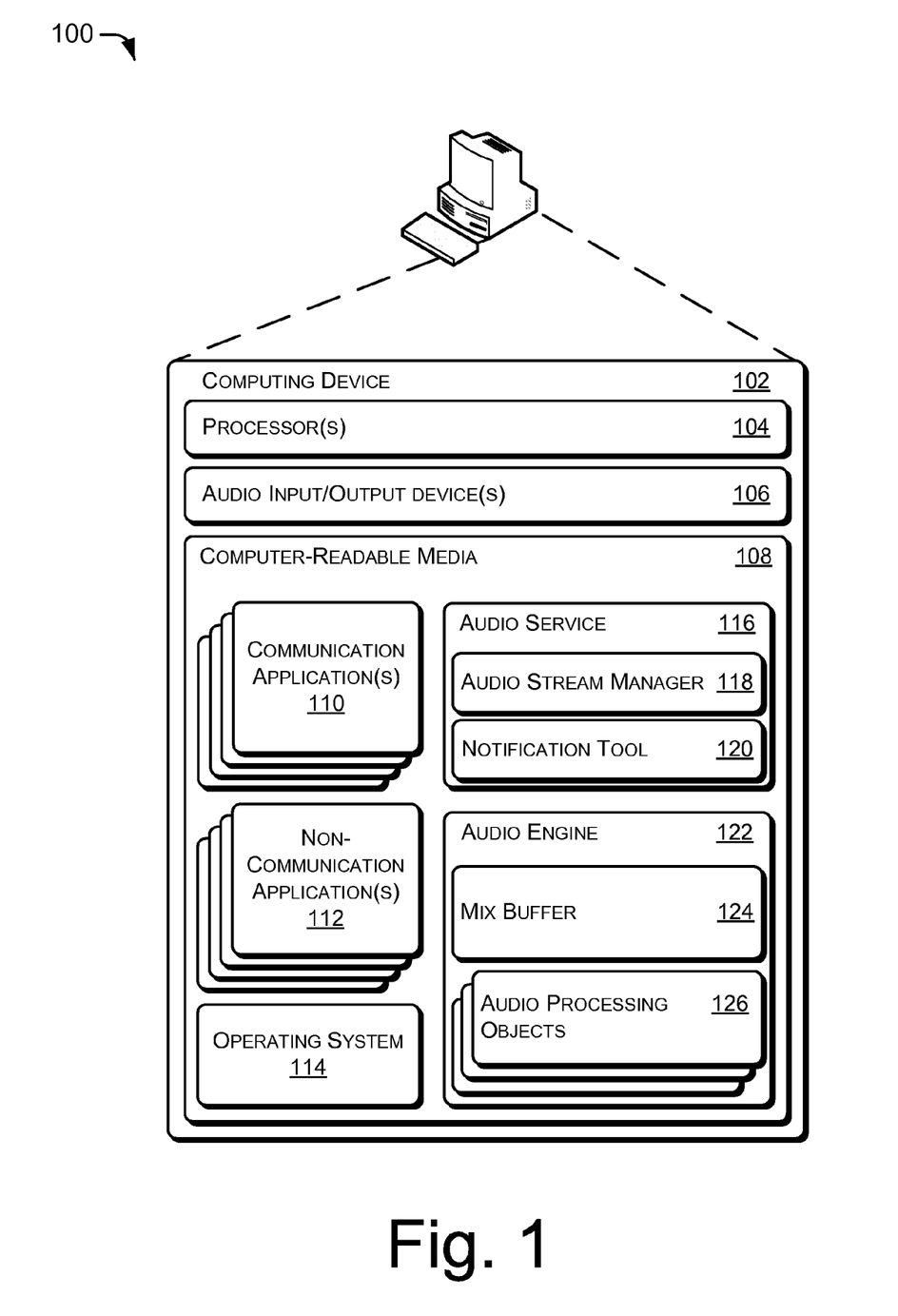
FIG. 1 illustrates an operating environment in which various principles and techniques described herein for audio stream notification and processing can be employed in accordance with one or more embodiments.

FIG. 1 illustrates generally at 100 one example of an operating environment that is operable to employ one or more techniques and/or processes for audio stream notification and processing, in accordance with one or more embodiments. Environment 100 includes a computing device 102 having one or more processors 104, one or more audio input/output devices 106, and one or more computer-readable media 108. The computing device 102 can be embodied as any suitable computing device such as, by way of example and not limitation, a desktop computer, a portable computer, or a handheld computer such as a personal digital assistant (PDA), cell phone, and the like. The computing device 102 is configured such that it can interface with one or more networks (not shown), such as a local area network, a wide area network, the Internet, the World Wide Web, and so on.

The audio input/output devices 106 provide audio input/output functionality for the computing device 102, and can include a speaker, a microphone, a sound card, and so on.

Illustrated as part of the computing device 102 are one or more communications applications 110, one or more non-communications applications 112, and an operating system 114. Examples of communications applications include applications that are operable to capture and render audio signals, such as Voice-over-Internet Protocol (VoIP) applications, certain Internet messaging applications, interactive gaming applications, and so on. Non-communications applications typically include applications that render audio, such as media player applications, system notification applications or processes, and so on. The operating system 114 may include one or more default policies for handling audio streams (e.g., communication streams and/or non-communication streams) for the computing device.

The computing device 102 also includes an audio service 116, and the audio service includes an audio stream manager 118 and a notification tool 120. The audio stream manager is configured to perform a variety of tasks for the computing device, such as tracking audio streams, maintaining a list of audio stream identifiers, detecting if an audio stream is a communication stream or a non-communication stream, and performing audio stream attenuation. In response to the initiation of a communication stream, the audio stream manager may identify one or more audio streams that are to be ducked and perform ducking on the audio stream(s). The notification tool is configured to handle notification registration for the audio service and to send notifications to applications that have registered for notification.

In some embodiments, a particular application may not be configured to identify its audio stream as a communication stream or a non-communication stream. In these embodiments, the audio service and/or other functionality of the computing device may be configured to recognize the application and flag the application's audio stream(s) as a communication stream or a non-communication stream. For example, the audio service may maintain a list of applications and, for one or more of the applications, an identifier that identifies the application as utilizing a communication stream and/or a non-communication stream.

An audio engine 122 is stored on the computer-readable media and includes a mix buffer 124 and one or more audio processing objects (APOs) 126. Among other tasks, the audio engine acts as a transport component for transporting an audio stream from an application to an audio device. The mix buffer combines audio streams and makes the combined streams available to an audio device. Each of the audio processing objects is configured to perform one or more different signal processing tasks on an audio stream, such as stream attenuation, audio rate modulation, channel mixing (e.g., increasing and/or decreasing the number of channels in a stream), and/or any other suitable form of audio signal processing.

Example Processes

Figure 2:
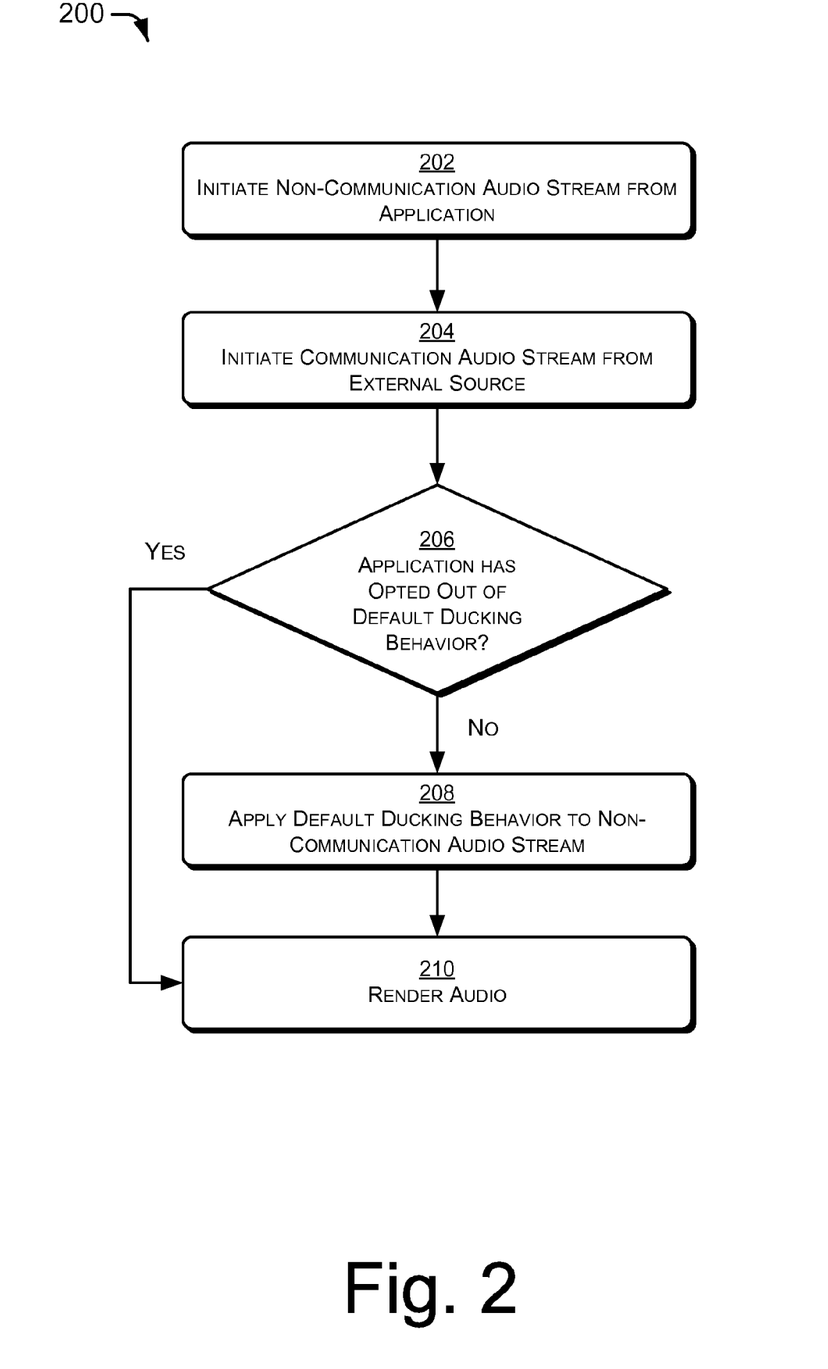
FIG. 2 is a flow diagram of a process for registering an application for audio stream notification and for processing an audio stream in response to the initiation of a communication stream in accordance with one or more embodiments.
Figure 3:
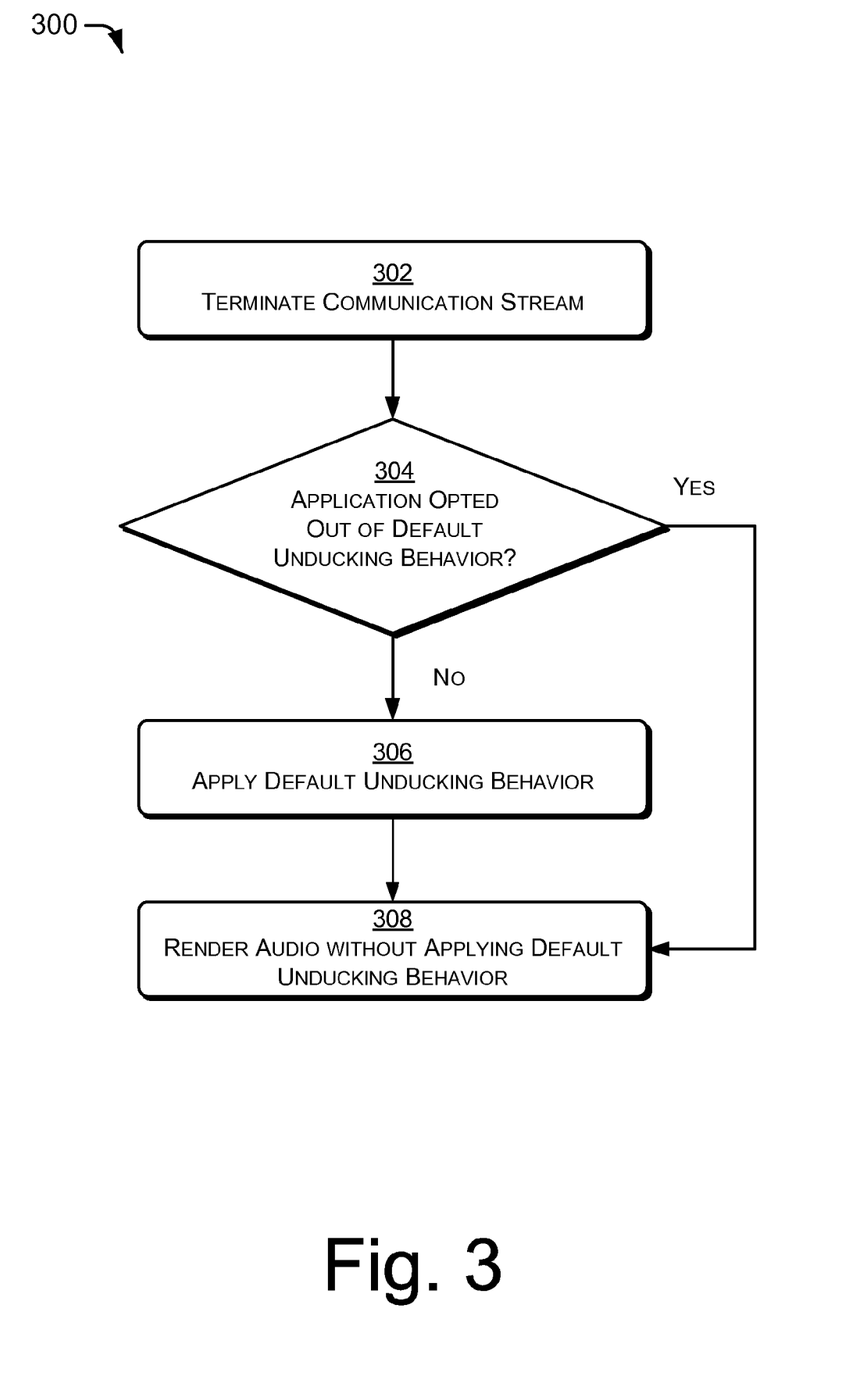
FIG. 3 is a flow diagram of a process for audio stream notification of communication stream termination in accordance with one or more embodiments.
Figure 4:
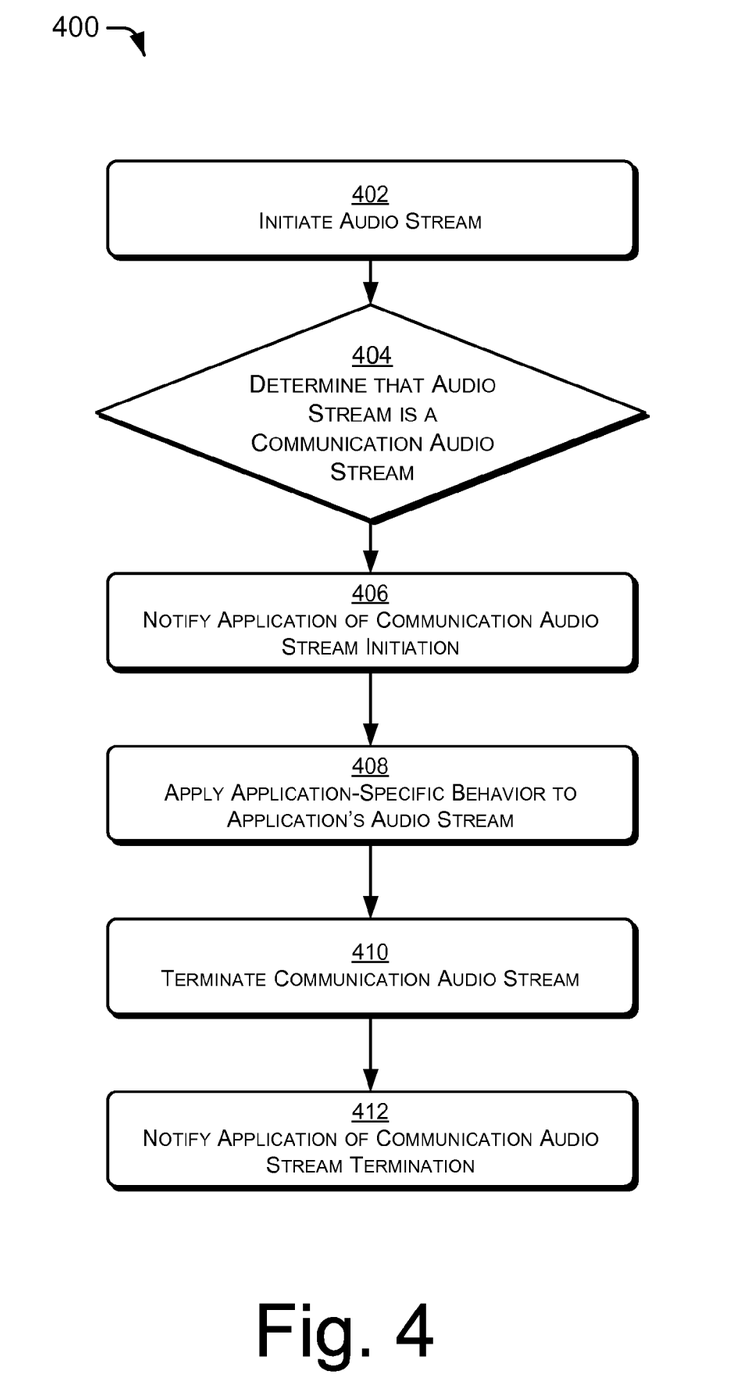
FIG. 4 is a flow diagram of a process for notifying an application that a communication audio stream has been initiated in accordance with one or more embodiments.

FIGS. 2-4 illustrate examples of processes and operating scenarios that implement aspects of the principles and techniques discussed herein, according to one or more embodiments. These processes can be implemented in connection with any suitable hardware, software, firmware, or combination thereof.

FIG. 2 illustrates a flow diagram 200 that represents one process for opting out of system audio stream behavior. At 202, a non-communication audio stream is initiated by an application. At 204, a communication audio stream is initiated from a source external from the application. Initiation of an audio stream (including a communication and/or a non-communication stream) can cause an audio service to specify a particular audio processing object (APO) or collection of APOs for the audio stream. The audio service may include logic that maintains a reference to each APO for an audio stream. In some embodiments, this allows the audio service to perform behavior modification on an audio stream in response to a notification or other event. For example, when a communication stream is initiated, a volume attenuation APO may attenuate the volume of an audio stream in response to the communication stream initiation.

Block 206 determines if the application has previously opted out of system default ducking behavior. For example, a system audio service may specify a system default ducking behavior that automatically attenuates the volume of non-communication streams by a predetermined amount (e.g., 30%, 50%, and so on) when a communication stream is initiated.

If the application has not opted out of system default ducking behavior ("No"), the default ducking behavior is applied to the application's non-communication stream. If the application has opted out of system ducking behavior, the default ducking behavior is not applied to the application's non-communication stream. At 210, the system audio is rendered, including the application's non-communication stream and the communication stream from the external source. In some embodiments, an application can opt out of default system ducking behavior by calling an "opt out" application programming interface (API) that notifies the system that the application is opting out of the default behavior. The API may be provided to the application by an audio service.

FIG. 3 illustrates a flow diagram 300 that represents one process for determining if an application has opted out of system default unducking behavior. At 302, a communication stream that originates externally from an application is terminated. In one embodiment, the termination of a communication stream occurs as a result of a communications application closing an open communication stream. At 304, it is determined if the application has opted out of default system unducking behavior. If the application has not opted out of default unducking behavior ("No"), at 306, default unducking behavior is applied to the application's audio stream. In one example embodiment, a default unducking behavior may cause an audio stream that was attenuated in response to the initiation of a communication stream to be returned to a pre-attenuation level. If the application has opted out of default ducking behavior ("Yes"), at 308 an audio stream associated with the application is rendered without applying the default unducking behavior.

FIG. 4 illustrates a flow diagram 400 of one example process for notifying an application that a communication audio stream has been initiated. This example process assumes that the application has registered for such notification. Registration may be handled by an audio service, which may track application registration (e.g., via an application and/or audio stream ID) and notify a registered application when a communication stream is initialized. In one example embodiment, an application may register for notification by calling an application programming interface (API) to register a callback object with the audio service.

Block 402 initiates an audio stream. Block 404 determines that the audio stream is a communication audio stream. Block 406 notifies the application that the communication audio stream has been initiated. In other example implementations, Block 404 may determine that the audio stream is a non-communication audio stream, and thus the application would not be notified as in block 406. Block 408 applies one or more application-specific behaviors to an audio stream owned by the application. In one or more embodiments, the application-specific behavior can be configured by a user. Block 410 terminates the communication audio stream, and block 412 notifies the application of the communication audio stream termination.

Figure 5:
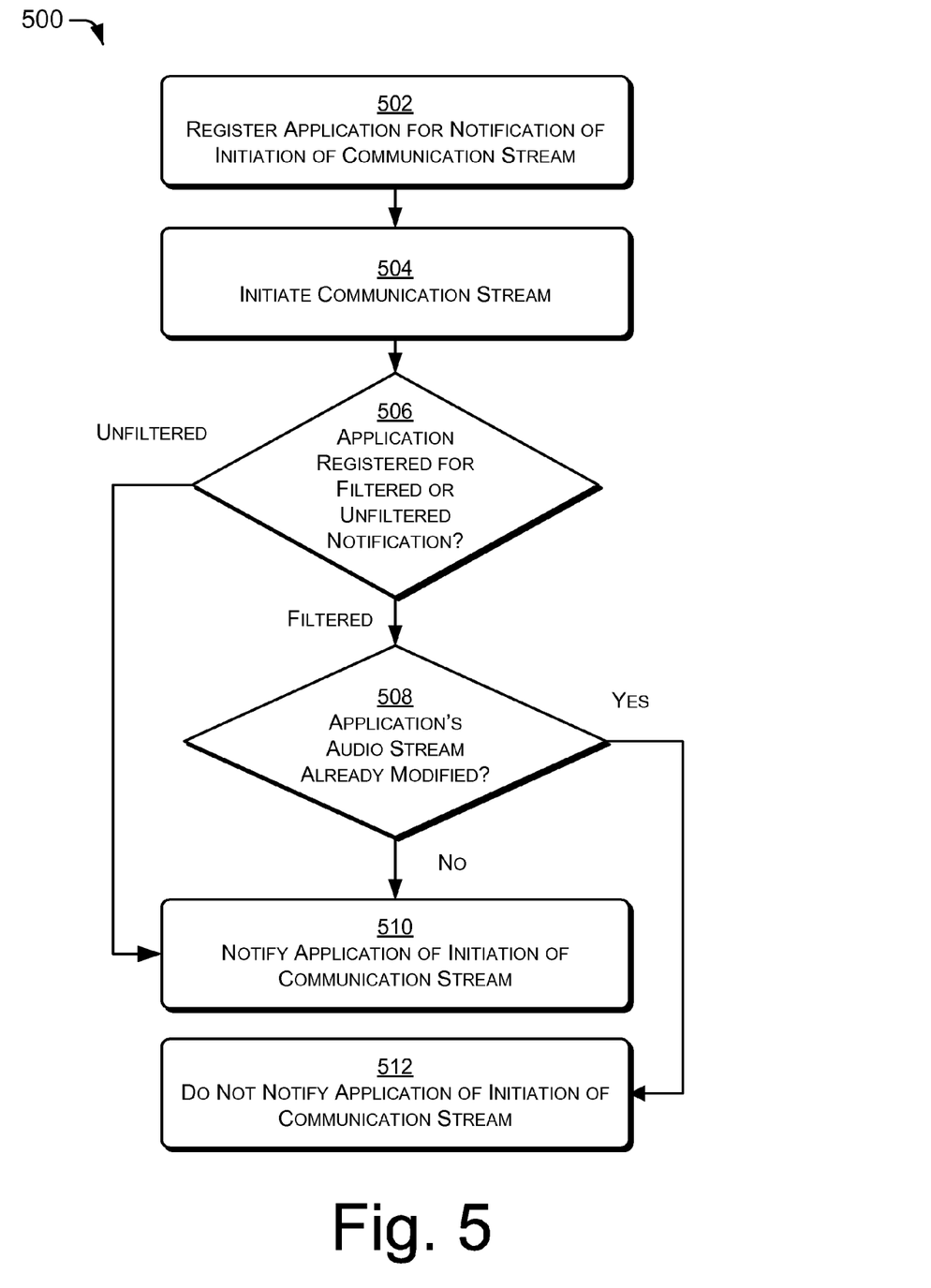
FIG. 5 is a flow diagram of a process for filtered and/or unfiltered notification of communication stream initiation and termination in accordance with one or more embodiments.

FIG. 5 illustrates a flow diagram 500 that represents one process for implementing filtered and/or unfiltered notification. At 502, an application registers for notification of a communication stream initiation. At 504, a communication stream is initiated. At 506, it is determined if the application registered for filtered notification or unfiltered notification. In one embodiment, when an application registers for notification (e.g., as in act 502), the application may specify that it is only to be notified of a communication stream initiation when an audio stream associated with the application has not already been modified in response to the initiation of another communication audio stream ("filtered notification").

In one example, when a communication stream is initiated, an audio service may determine that one or more active audio streams are to be ducked. If an audio stream associated with the application has not already been ducked (e.g., in response to the initiation of another communication stream), and the application has registered for filtered notification, the application would be notified that a communication stream has been initiated and that the audio stream associated with the application is going to be ducked. However, in this example, if the audio stream has already been ducked, and the application has registered for filtered notification, the application would not be notified of the communication stream initiation. As discussed above, the application can submit to system default ducking behavior, and/or the application can perform custom audio stream behavior in response to the initiation of a communication stream.

If the application has registered for unfiltered notification, the application is notified of the initiation of a communication stream (e.g., that a communications application is about to begin delivering audio signals to the communication stream) whether or not an audio stream owned by the application has been modified in response to the initiation of another communication stream. In one embodiment, the notification can include a data packet generated by the audio service. The data packet may include a callback method that informs the application that the communication stream has been initialized and that the audio stream is about to be created. Unfiltered notification may allow an application to perform custom audio stream behavior(s) in response to communication stream initiation.

Returning to the discussion of the flow diagram, if the application has registered for filtered notification ("Filtered"), is it determined at 508 if an audio stream associated with the application has already been modified in response to an initiation of another communication stream. In some embodiments, the modification may include one or more system default behavior modifications that occur in response to the initiation of a communication stream, such as non-communication stream ducking. If the audio stream has not been modified, at 510, the application is notified of the initiation of the communication stream. If it is determined at 508 that the audio stream associated with the application has already been modified in response to an initiation of another communication stream, then at 512, the application is not notified of the initiation of the communication stream.

Returning to act 506, if the application has registered for unfiltered notification ("Unfiltered"), then at 510, the application is notified of the initiation of the communication stream. In an unfiltered notification scenario, the application is notified of the initiation of a communication stream even if an audio stream associated with the application has already been modified in response to an initiation of another communication stream. While process 500 is discussed with reference to communication stream initiation, the process may also be applied to notification of communication stream termination.

The processes and scenarios discussed herein are discussed in reference to audio stream ducking. However, ducking is used for purposes of an example audio stream behavior, and it is contemplated that the processes and techniques discussed herein are applicable to a variety of different audio stream behaviors.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer-readable media. Computer-readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

CONCLUSION

The above-described principles and techniques provide audio stream notification and audio signal processing for a computing device. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
    initiating a communication audio stream;
    determining if an application is registered for filtered notification or unfiltered notification of the initiation of the communication audio stream;
    responsive to a determination that the application is registered for filtered notification of the initiation of the communication audio stream:
        determining, using an audio service executing on one or more processors, if a non-communication audio stream associated with the application has already been modified; and
        responsive to a determination that the non-communication audio stream associated with the application has not already been modified, notifying the application of the initiation of the communication audio stream; and
    responsive to a determination that the application is registered for unfiltered notification of the initiation of the communication audio stream, notifying the application of the initiation of the communication audio stream.

2. A method as recited in claim 1, wherein the application registers for filtered notification or unfiltered notification by calling an application programming interface (API) to register an application callback object with the audio service, the application callback object being configured to receive notifications from the audio service of the initiation of a communication audio stream.

3. A method as recited in claim 1, wherein the communication audio stream comprises an audio capture stream and/or an audio render stream.

4. A method as recited in claim 1, wherein the communication audio stream comprises metadata that identifies the stream as a communication audio stream.

5. A method as recited in claim 1, wherein the default behavior modification comprises attenuation of one or more non-communication audio streams.

6. A method as recited in claim 1, wherein the act of notifying comprises providing an application programming interface (API) that may be called by the application to indicate that the application is opting out of the default behavior modification, the default behavior modification comprising audio stream behavior that is applied to one or more non-communication audio streams in response to the initiation of the communication audio stream.

7. A method as recited in claim 1, wherein registering for the unfiltered notification comprises requesting notification of the initiation of the communication audio stream in an instance where the non-communication audio stream associated with the application has already been modified.

8. A method as recited in claim 1,
    wherein the application provides an indication that the application is opting out of default audio stream behavior modification that occurs in response to the initiation of a communication audio stream.

9. A method as recited in claim 8, wherein responsive to the application being notified of the initiation of the communication audio stream, the application applies one or more application-specific audio stream behaviors to the non-communication audio stream associated with the application.

10. One or more computer-readable storage memory storing computer-executable instructions, the computer-executable instructions being executable by a computing device to implement a method comprising:
    initiating a communication audio stream;
    determining if an application is registered for filtered notification or unfiltered notification of the initiation of the communication audio stream;
    responsive to a determination that the application is registered for filtered notification of the initiation of the communication audio stream:
        determining if a non-communication audio stream associated with the application has already been modified; and
        responsive to a determination that the non-communication audio stream associated with the application has not already been modified, notifying the application of the initiation of the communication audio stream; and
    responsive to a determination that the application is registered for unfiltered notification of the initiation of the communication audio stream, notifying the application of the initiation of the communication audio stream.

11. The one or more computer-readable storage memory of claim 10, wherein the application registers for filtered notification or unfiltered notification by calling an application programming interface (API) to register an application callback object with the audio service, the application callback object being configured to receive notifications from the audio service of the initiation of a communication audio stream.

12. The one or more computer-readable storage memory of claim 10, wherein the communication audio stream comprises an audio capture stream and/or an audio render stream.

13. The one or more computer-readable storage memory of claim 10, wherein the communication audio stream comprises metadata that identifies the stream as a communication audio stream.

14. The one or more computer-readable storage memory of claim 10, wherein the default behavior modification comprises attenuation of one or more non-communication audio streams.

15. The one or more computer-readable storage memory of claim 10, wherein the act of notifying comprises providing an application programming interface (API) that may be called by the application to indicate that the application is opting out of the default behavior modification, the default behavior modification comprising audio stream behavior that is applied to one or more non-communication audio streams in response to the initiation of the communication audio stream.

16. The one or more computer-readable storage memory of claim 10, wherein registering for the unfiltered notification comprises requesting notification of the initiation of the communication audio stream in an instance where the non-communication audio stream associated with the application has already been modified.

17. The one or more computer-readable storage memory of claim 10, wherein the application provides an indication that the application is opting out of default audio stream behavior modification that occurs in response to the initiation of a communication audio stream.

18. The one or more computer-readable storage memory of claim 17, wherein responsive to the application being notified of the initiation of the communication audio stream, the application applies one or more application-specific audio stream behaviors to the non-communication audio stream associated with the application.

19. An apparatus comprising:
one or more processors;
one or more computer-readable storage media storing computer-executable instructions, the computer-executable instructions being executable by the one or more processors to implement a method comprising:
initiating a communication audio stream;
determining if an application is registered for filtered notification or unfiltered notification of the initiation of the communication audio stream;
responsive to a determination that the application is registered for filtered notification of the initiation of the communication audio stream:
  determining if a non-communication audio stream associated with the application has already been modified; and
  responsive to a determination that the non-communication audio stream associated with the application has not already been modified, notifying the application of the initiation of the communication audio stream; and
responsive to a determination that the application is registered for unfiltered notification of the initiation of the communication audio stream, notifying the application of the initiation of the communication audio stream.

20. An apparatus as recited in claim 19, wherein, as part of the method, the application registers for filtered notification or unfiltered notification by calling an application programming interface (API) to register an application callback object with an audio service, the application callback object being configured to receive notifications from the audio service of the initiation of a communication audio stream.

* * * * *